US010833929B2

(12) United States Patent
Watsen et al.

(10) Patent No.: US 10,833,929 B2
(45) Date of Patent: Nov. 10, 2020

(54) SECURE REMOTE BOOTSTRAPPING OF NETWORK DEVICE

(71) Applicant: Juniper Networks, Inc., Sunnyvale, CA (US)

(72) Inventors: Kent A. Watsen, Leesburg, VA (US); Guy Fedorkow, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

(21) Appl. No.: 16/234,379

(22) Filed: Dec. 27, 2018

(65) Prior Publication Data
US 2020/0213191 A1    Jul. 2, 2020

(51) Int. Cl.
| | | |
|---|---|---|
| G06F 15/17 | (2006.01) |
| H04L 12/24 | (2006.01) |
| H04L 9/30 | (2006.01) |
| H04L 29/12 | (2006.01) |
| H04L 29/08 | (2006.01) |

(52) U.S. Cl.
CPC .......... H04L 41/0806 (2013.01); H04L 9/30 (2013.01); H04L 41/0816 (2013.01); H04L 61/2015 (2013.01); H04L 67/34 (2013.01)

(58) Field of Classification Search
CPC ............. H04L 41/0806; H04L 41/0886; H04L 41/0816; H04L 41/0866; H04L 9/30; H04L 61/2015; H04L 67/34
USPC ....................................................... 709/220
See application file for complete search history.

(56) References Cited

U.S. PATENT DOCUMENTS

| | | | | |
|---|---|---|---|---|
| 5,307,497 A | * | 4/1994 | Feigenbaum | G06F 9/4406 713/1 |
| 6,996,706 B1 | * | 2/2006 | Madden | G06F 9/4406 711/113 |
| 7,698,572 B2 | * | 4/2010 | Janke | G06K 19/073 713/189 |
| 8,539,557 B1 | * | 9/2013 | Buckner | G06F 21/31 726/4 |

(Continued)

OTHER PUBLICATIONS

"LN1000 Mobile Secure Router Quick Start," Juniper Networks, Inc., Part No. 530-064222, Revision 01, Mar. 2015, 7pp.
(Continued)

*Primary Examiner* — Ruolei Zong
(74) *Attorney, Agent, or Firm* — Shumaker & Sieffert, P.A.

(57) ABSTRACT

Techniques are disclosed for performing secure remote bootstrapping operations of a network device such that sensitive configuration resides in volatile memory or is inaccessible upon power loss. In one example, a network device performs a first request for onboarding information. In response to determining that a first initialization of the network device has not occurred, the network device performs the first initialization by configuring, with the onboarding information, the network device to mount a portion of a file system to a volatile memory and not a non-volatile memory. After rebooting, the network device performs a second request for the onboarding information. In response to determining that the first initialization of the network device has occurred, the network device performs a bootstrapping operation of the network device. The bootstrapping operation may configure the network device for remote management such that any subsequent configuration obtained remotely is not retained on power loss.

20 Claims, 4 Drawing Sheets

(56) References Cited

U.S. PATENT DOCUMENTS

| | | | | |
|---|---|---|---|---|
| 10,063,991 B2* | 8/2018 | Alnas | .................. | H04W 4/50 |
| 2012/0311332 A1* | 12/2012 | Johnsen | ............... | H04L 9/3234 |
| | | | | 713/168 |
| 2016/0315803 A1* | 10/2016 | Sadana | ................ | H04L 41/082 |
| 2019/0058656 A1* | 2/2019 | Gundersen | ......... | H04L 47/2483 |
| 2019/0132211 A1* | 5/2019 | Yeung | .................. | H04L 41/145 |
| 2019/0140897 A1* | 5/2019 | Yeh | ..................... | H04L 45/745 |

OTHER PUBLICATIONS

Watsen et al., "Zero Touch Provisioning for Networking Devices," draft-ietf-netconf-zerotouch-25, Internet Draft, Sep. 13, 2018, 176 pp.

"LN1000™ Mobile Secure Router," Hardware Guide, Juniper Networks, Inc., modified Jul. 2, 2015, 62 pp.

"LN1000 Mobile Secure Router," Juniper Networks, Inc., Jan. 2012, 6 pp.

"LN1000 Mobile Secure Router," Juniper Networks, Inc., modified Jul. 2, 2015, 64 pp.

Extended European Search Report received in corresponding EP Application No. 19182027.3, dated Nov. 5, 2019, 9 pp.

* cited by examiner

SECURE REMOTE BOOTSTRAPPING OF NETWORK DEVICE

TECHNICAL FIELD

This disclosure generally relates to network devices and, more particularly, to deployment and activation of network devices

BACKGROUND

Large enterprises often face the challenge of mass distribution and deployment of network infrastructure. For example, an enterprise may operate a number of geographically distributed facilities (e.g., offices, retail outlets, and the like) that require network connectivity to a central or main office of the enterprise and optionally to each other. In such cases, a challenge arises when the enterprise desires to install or upgrade network devices with each of the many remote facilities. For example, a central information technology (IT) administrative group of the enterprise may coordinate an effort to upgrade computers, firewalls, gateways, routers, VPN appliances, switches or other network equipment in each of the remote facilities. Such operations may require deployment and activation of hundreds or sometimes thousands of devices.

To simplify the process, the enterprise may purchase similar network devices for deployment at the remote facilities in a single mass rollout. By purchasing similar if not the same network devices, the enterprise may ease administrative burdens with respect to deploying and operating these network devices. In such cases, it is common for the enterprise to contract with the manufacturer to ship the units directly to the remote facilities. This saves shipping costs and offers the advantage of alleviating the central IT group from having the burden of physically receiving and reshipping the devices. However, when devices are shipped directly from the manufacturer to the final location at which the devices are to be deployed, it may not always be possible for a trained network administrator to physically manipulate the devices to ensure proper installation and activation. As a result, the person who configures the devices is typically a store manager or other person who does not have experience in configuring network devices. In such cases, it may be difficult to ensure that the devices are correctly deployed and activated in a manner so as to match a centralized device management system often maintained by the IT group for remotely monitoring and managing devices in the enterprise.

SUMMARY

In general, the disclosure describes techniques for performing a secure remote bootstrapping operation of a network device. To reduce the technical complexity of configuring a network device to an unsophisticated user, conventional devices may use the Zero-touch Provisioning (ZTP) to remotely and automatically perform a first-time configuration of a network device for use within an enterprise network. Additional information with respect to the ZTP protocol is described in "Zero Touch Provisioning for Networking Devices," Internet-Draft, Internet Engineering Task Force (IETF), available at https://tools.ietf.org/html/draft-ietf-netconf-zerotouch, the entire contents of which is incorporated herein by reference.

However, network devices that are deployed to public places (e.g., kiosks, shopping malls, offices, apartment basements) may still be vulnerable to attack by a malicious actor with physical access to the device. For example, a conventional network device may store sensitive information, such as user data and credentials, network traffic, or the address and identity of other devices within the enterprise network, within a non-volatile memory of the network device. A malicious actor with physical access to the network device potentially could remove the non-volatile memory and glean valuable information from analysis of data stored on the non-volatile memory. One potential solution would be to configure the network device to store such sensitive information within a volatile memory of the network device, such that the sensitive information is lost upon loss of power to the device. However, this may be beyond the ability of an end-user that relies upon ZTP to perform first-time configuration of the network device. Furthermore, some security configurations should be performed in non-volatile memory to prevent loss of power from removing the security configurations, further increasing the technical burden on the end-user.

Accordingly, techniques are disclosed for performing a secure, remote bootstrapping operation of a network device such that sensitive information is stored only on a volatile memory of the network device. For example, a network device as described herein may, during an initial boot cycle, perform a first touchless provisioning operation to retrieve onboarding information. The network device may process the onboarding information to determine whether a first initialization of the network device has occurred. If the first initialization has not yet occurred, the network device performs the first initialization. For example, the network device may perform the first initialization by configuring local user access permissions and configuring itself to mount at least a portion of a file system to a volatile memory of the network device and not a non-volatile memory of the network device. Further, the network device reboots itself.

For each subsequent boot cycle, the network device mounts at least a portion of the file system to the volatile memory and/or encrypts at least a portion of the non-volatile memory. Further, the network device performs a second touchless provisioning operation to request the onboarding information. The network device processes the onboarding information to determine whether the first initialization of the network device has occurred. In response to determining that the first initialization has occurred, the network device performs a bootstrapping operation. As examples of bootstrapping operations, the network device may configure itself for remote management by another network device.

Thus, by using the techniques of the disclosure, the network device may perform a secure remote bootstrapping operation. Further, upon loss of power to the network device, the network device loses information stored on the volatile memory or access to encrypted information stored on the non-volatile memory. Thus, the network device does not retain any information that may be of use to a malicious actor that has physical access to the network device. Accordingly, the techniques of the disclosure provide specific technical improvements to the computer-related field of network device deployment and configuration. For example, the techniques of the disclosure may allow for the deployment to public spaces of network devices that are secured from physical or local attack by a malicious actor. Further, the techniques of the disclosure may allow for the use of touchless provisioning to securely and remotely configure a network device. Additionally, the techniques of the disclosure may reduce the cost and technical burden on the end user of deploying and configuring network devices to operate within an enterprise network.

In one example, this disclosure describes a method comprising: performing, by one or more processors of a network device, a first request for onboarding information for the network device; processing, by the one or more processors, the onboarding information to determine that a first initialization of the network device has not occurred; in response to determining that the first initialization of the network device has not occurred, performing the first initialization by: configuring, by the one or more processors and with the onboarding information, the network device to mount at least a portion of a file system to a volatile memory of the network device and not a non-volatile memory of the network device; and rebooting, by the one or more processors, the network device; after rebooting the network device: performing, by the one or more processors, a second request for the onboarding information for the network device; processing, by the one or more processors, the onboarding information to determine that the first initialization of the network device has occurred; and in response to determining that the first initialization of the network device has occurred, performing, by the one or more processors, a bootstrapping operation of the network device.

In another example, this disclosure describes a network device comprising: a non-volatile memory; a volatile memory; and one or more processors configured to: perform a first request for onboarding information for the network device; process the onboarding, information to determine that a first initialization of the network device has not occurred; in response to determining that the first initialization of the network device has not occurred, perform the first initialization by: configuring, with the onboarding information, the network device to mount at least a portion of a file system to the volatile memory and not the non-volatile memory; and rebooting the network device; after rebooting the network device: perform a second request for the onboarding information for the network device; process the onboarding information to determine that the first initialization of the network device has occurred; and in response to determining that the first initialization of the network device has occurred, perform a bootstrapping operation of the network device.

In another example, this disclosure describes a non-transitory computer-readable medium comprising instructions configured to cause one or more processors of a network device to: perform a first request for onboarding information for the network device; process the onboarding information to determine that a first initialization of the network device has not occurred; in response to determining that the first initialization of the network device has not occurred, perform the first initialization by: configuring, with the onboarding information, the network device to mount at least a portion of a file system to a volatile memory of the network device and not a non-volatile memory of the network device; and rebooting the network device; after rebooting the network device: perform a second request for the onboarding information for the network device; process the onboarding information to determine that the first initialization of the network device has occurred; and in response to determining that the first initialization of the network device has occurred, perform a bootstrapping operation of the network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
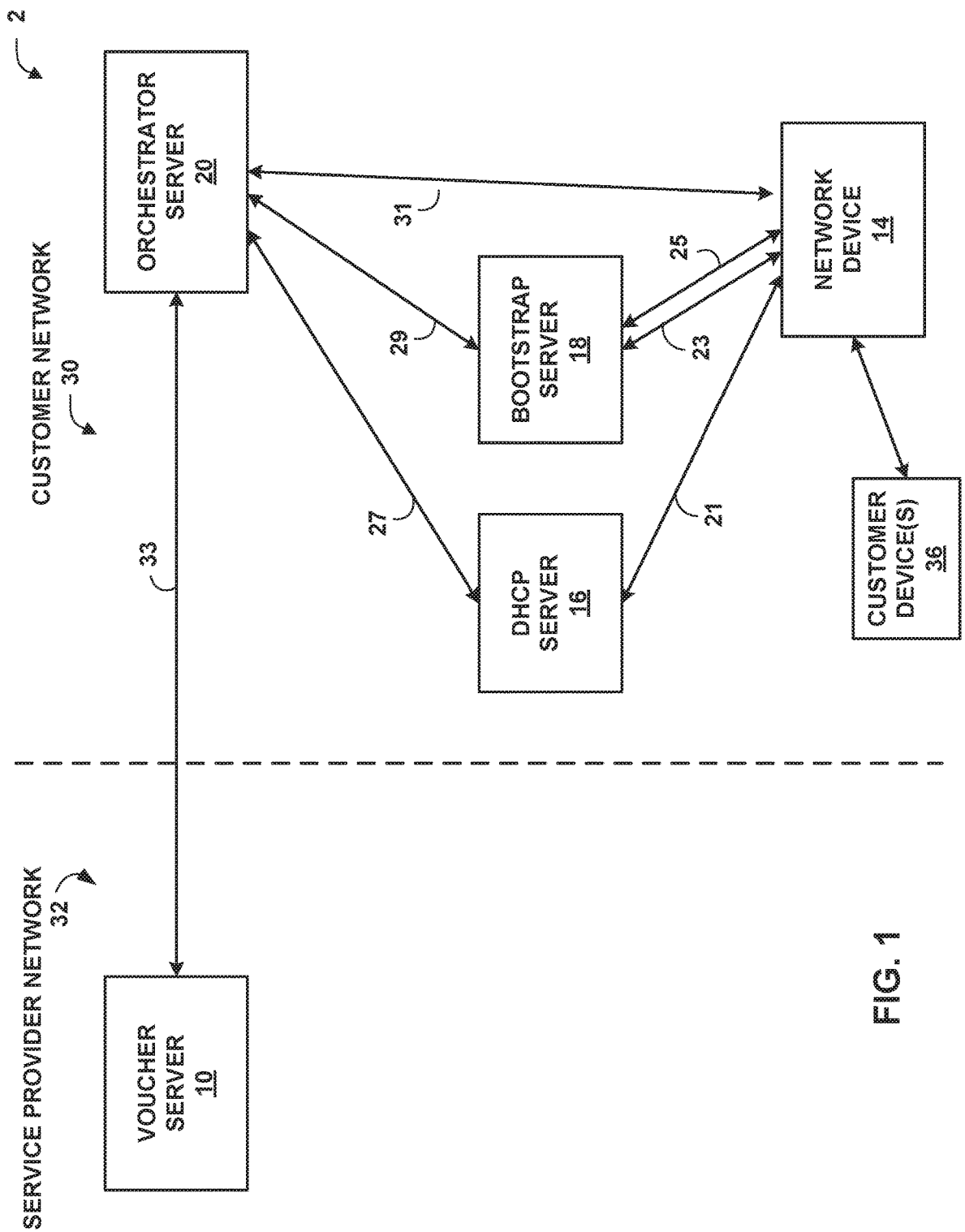
FIG. 1 is a block diagram illustrating an example system for performing a secure remote bootstrapping operation in accordance with the techniques of the disclosure.

FIG. 1 is a block diagram illustrating example system 2 for performing a secure remote bootstrapping operation in accordance with the techniques of the disclosure. In general, this disclosure describes techniques for securely and remotely configuring network device 14. To deploy and manage network device 14 with a centralized management system (e.g., orchestrator server 20 and voucher server 10), network device 14 solicits network settings, management configurations, and security configurations automatically upon power-up. In accordance with the techniques of this disclosure, network device 14 receives configuration information and a boot image from, e.g., bootstrap server 18.

System 2, in the example of FIG. 1, may include a plurality of sub-networks, e.g., service provider network 32 and customer network 30. Service provider network 32 provides to customer network 30 network services that are available for request and use by customer devices 36 within customer network 30. As will be discussed in greater detail below, service provider network 32 provides, via voucher server 10, authentication and verification services to customer network 30. In some examples, service provider network 32 is an Internet Service Provider (ISP) that provides customer network 30 with access to one or more external networks such as, for example, the Internet.

Customer network 30 may correspond to, for example, a retail outlet or a corporate division (e.g., legal, engineering, marketing, sales, accounting, etc.). Customer network 30 may correspond to a new sub-network for which new network device 14 is to be enabled. Customer network 30 includes orchestrator server 20 that manages each network element (e.g., router, switch, gateway, VPN appliance, firewall, and the like) within customer network 30, DHCP server 16 that provides DHCP services to devices within customer network 30, bootstrap server 18 that provides configuration and bootstrap services to devices within customer network 30, one or more customer devices 36, and network device 14 that provides network traffic routing and forwarding services to customer devices 36. For ease of discussion, customer network 30 is depicted as including a single network device 14, a single DHCP server 16, and a single bootstrap server 18. However, in other examples of the techniques of the disclosure, customer network 30 includes a plurality of network devices 14, a plurality of DHCP servers 16, a plurality of bootstrap servers 18, or some combination thereof.

Orchestrator server 20 is communicatively coupled to network device 14 of customer network 30. Orchestrator server 20 may obtain ownership vouchers 33 from voucher server 10 of service provider network 32, as described in greater detail below. Orchestrator server 20 may provide DHCP configuration 27 to DHCP server 16 to enable DHCP server 16 to provide DHCP services to devices within customer network 30, such as network device 14. Additionally, orchestrator server 20 may provide bootstrap configuration information 29 to bootstrap server 18 to enable bootstrap server 18 to provide bootstrapping services to network device 14. Once network device 14 is deployed and activated, orchestrator server 20 may manage network device 14 using a communications protocol, such as NETCONF. Managed network device 14 is also referred to herein as a network "element." In common practice, orchestrator server 20 and network device 14 managed by orchestrator server 20 are centrally maintained by an group of the customer and are collective referred to as an element management system (EMS) or a network management system (NMS). An administrator may interact with orchestrator server 20 to remotely monitor and configure network device 14. For example, the administrator may receive alerts from orchestrator server 20 regarding network device 14, view configurations or management data of network device 14, modify the configurations or management data of network device 14, add new network devices to customer network 30, remove existing network device 14 from customer network 30, or otherwise manipulate customer network 30 and network device 14. In some examples, orchestrator server 20 provides a device management interface (DMI) for an administrator to manage network device 14 once network device 14 becomes active. The DMI may comprise an interface, such as a graphical user interface (GUI) or command line interface, by which the administrator dynamically adjusts configuration data for network device 14 or other devices managed by orchestrator server 20.

DHCP server 16 provides DHCP services to devices within customer network 30, such as network device 14, bootstrap server 18, and customer devices 36. As described herein, network device 14 may request bootstrapping data from DHCP server 16 via a touchless provisioning operation to perform automatic configuration of network device 14. For example, network device 14 may request a network assignment from DHCP server 16 as well as redirect information that redirects network device 14 to bootstrap server 18 for onboarding information. In some examples, the touchless provisioning operation is a ZTP operation.

Bootstrap server 18 may be used as a source of onboarding information for network device 14. As described herein, network device 14 may request onboarding information from bootstrap server 18 via a touchless provisioning operation to perform automatic configuration of network device 14. In some examples, the touchless provisioning operation is a ZTP operation. In some examples, Bootstrap server 18 is a RESTCONF server implementing a YANG module.

Network device 14 generally is a network device that may be difficult for inexperienced, non-technical users to operate. Network device 14, for example, typically does not include a keyboard, a monitor, or other conventional user interfaces. Accordingly, a console is not generally accessible when starting network device 14. Network device 14 may correspond, for example, to a router, switch, gateway, hub, server, computing device, computing terminal, printer, firewall, intrusion detection and/or prevention device, wireless Access Point (AP), or other type of network device. An inexperienced user, such as a store manager, may have difficulty manually configuring network device 14. Accordingly, the techniques of this disclosure may simplify the process of configuring network devices 14 through the use of a secure touchless provisioning operation, which is used by network device 14 to configure itself during a boot cycle, at which time an input console is typically not available.

A boot cycle is generally a process during which a processor of a device, such as one of network devices 14, "bootstraps" loading of an operating system kernel. Generally, the processor includes hard-coded instructions to retrieve a boot loader from a defined memory address following an initial receipt of power, that is, after the device is initially turned on. The boot loader includes bootstrapping instructions for loading the kernel, as well as for initializing variables, such as various register values. In some examples, the boot loader may include instructions for performing a touchless provisioning operation to retrieve onboarding information used for loading the kernel and/or mounting a file system for network device 4.

Customer devices 36 may be, for example, personal computers, laptop computers or other types of computing devices associated with users of customer network 30. Additional examples of customer devices 36 include mobile telephones, laptop or desktop computers having, e.g., a 3G or 4G wireless card, wireless-capable netbooks, video game devices, pagers, smart phones, personal data assistants (PDAs), Internet of Things (IoT) devices such as televisions, refrigerators, light bulbs, thermostats, home security systems, baby monitors, or the like. Each of customer devices 36 may run a variety of software applications, such as word processing and other office support software, web browsing software, software to support voice calls, video games, videoconferencing, and email, among others. Customer devices 36 connect to customer network 30 via wired and/or wireless communication links. The term "communication link," as used herein, comprises any form of transport medium, wired or wireless, and can include intermediate nodes such as network devices, such as network device 14.

In accordance with the techniques of the disclosure, a secure, remote bootstrapping operation of a network device is disclosed such that sensitive information is stored only on a volatile memory of network device 14. To implement the techniques of the disclosure, network device 14 perform a touchless provisioning operation to retrieve onboarding information during each boot cycle of network device 14. Network device 14 processes the onboarding information to determine whether a first initialization of network device 14 has occurred. If the first initialization has not yet occurred, network device 14 performs the first initialization by configuring itself to mount at least a portion of a file system to a volatile memory of the network device and not a non-volatile memory of the network device and reboots itself.

For each subsequent boot cycle, network device 14 mounts at least a portion of the file system to the volatile memory and/or encrypts at least a portion of the non-volatile memory, such as, e.g., a swap portion of the non-volatile memory. Further, network device 14 performs another touchless provisioning operation to request the onboarding information. Network device 14 processes the onboarding information to determine whether the first initialization has occurred. In response to determining that the first initialization has occurred, network device 14 performs a bootstrapping operation. As examples of bootstrapping operations, the network device may configure itself for remote management by another network device, e.g., by Obtaining an IP address for a remote network device or security credentials for authenticating orchestrator server 20 or by establishing a local administrator account with which orchestrator server 20 can log into network device 14, etc.).

An example operation in accordance with the techniques of the disclosure is set forth in the algorithm below:

```
# check if running first time
if [running first time]; then
    do first-time initialization:
        set non-volatile configuration (e.g., disable console
            port or set root password).
        download and install a package that includes rc
            scripts to initialize a memory-based Master File
            System (MFS) to a volatile memory with
            encrypted swap, mount filesystems, and initialize
            filesystems, causing the MFS to mount to the
            volatile memory on boot.
        reboot the network device (this restarts the network
            device and also the secure touchless provisioning
            process)
else
    do normal configuration operations, per user's discretion
        actions performed here, depending on what they are,
            may or may not survive a power loss, depending
            on whether the actions affect files in filesystems
            moved to the MFS in the volatile memory.
fi
```

In one example of the techniques of the disclosure, upon startup, network device 14 performs first touchless provisioning operation 21 to request, from DHCP server 16, address information for bootstrap server 18. Typically, network device 14 makes this request using an unsecured protocol and blindly trusts the response. In some examples, the address information is a list of one or more bootstrap servers 18 from which network device 14 may obtain configuration information. In some examples, the list is a tuple data structure that specifies a hostname and a port for each bootstrap server 18. The address information is redirect information which redirects a request for configuration information from network device 14 to bootstrap server 18.

Upon receiving the address information for bootstrap server 18, network device 14 performs second touchless provisioning operation 23 to request, from bootstrap server 18, onboarding information for network device 14. In some examples, network device 14 makes the request using an unsecured connection. Network device 14 may blindly trust a TLS certificate of bootstrap server 18. Bootstrap server 18 may authenticate network device 14 via a TLS-level client certificate such as IDevID. Network device 14 receives the onboarding information from bootstrap server 18. Typically, the configuration information received from bootstrap server 18 is signed.

Network device 14 verifies the signature of bootstrap server 18 in the configuration information. After verifying the signature, network device 14 processes the onboarding information to determine whether a first initialization of the network device has occurred. If the first initialization has not yet occurred, network device 14 performs the first initialization. For example, network device 14 may perform the first initialization by configuring local user access permissions to limit local user access and configuring itself to mount at least a portion of a file system to a volatile memory of network device 14 and not a non-volatile memory of network device 14. Further, network device 14 reboots itself.

The onboarding information may include instructions to perform the configuring of the local user access permissions. For example, network device 14 may configure, based on the onboarding information, the local user access permissions by performing a secure hardening of network device 14 so as to limit local user access to network device 14. For example, network device 14 may disable one or more console ports and/or open management ports of network device 14 or set a root access password to network device 14. Typically, network device 14 stores the local user access permissions in a non-volatile memory of network device 14 such that the local user access permissions are not lost upon power loss to network device 14.

In some examples, the onboarding information specifies a particular boot image that network device 14 is to use, an initial configuration that network device 14 should use, and one or more scripts for execution by network device 14. In some examples, the onboarding information specifies a particular operating system type and version. In some examples, network device 14 uses the onboarding information to configure one or more remote management protocols, such as NETCONF over SSH, and to configure whether network device 14 initiates an outbound SSH connection, or opens a port enabling inbound SSH connections. In some examples, network device 14 uses the onboarding information to configure whether orchestrator server 20 or another user may access network device 14 via a root or other login. In some examples, network device 14 uses the onboarding information to configure how SSH authentication may be performed (e.g., via password, public-key encryption, RADIUS, tacplus, etc.).

For each subsequent boot cycle, network device 14 mounts at least a portion of the file system to the volatile memory and/or encrypts at least a portion of the non-volatile memory. Further, network device 14 performs third touchless provisioning operation 25 to request the onboarding information. Network device 14 processes the onboarding information to determine whether the first initialization of network device 14 has occurred. In response to determining that the first initialization has occurred, network device 14 performs a bootstrapping operation. As examples of bootstrapping operations, network device 14 may configure itself for remote management by another network device (e.g., orchestrator server 20). Further, network device 14 may perform volatile configuration of network device 14. As examples of volatile configuration, network device 14 may disable the console on system ports, enable access of system services via SSH, disable the use of passwords to network device 14 via SSH, allow root login via SSH, configure a root account for SSH public-key authentication, and configure network device 14 to initiate an outbound SSH session. These configurations may be lost upon loss of power to or reboot of network device 14. After completing the bootstrapping operation, network device 14 may establish secure management connections (e.g., NETCONF) to orchestrator server 20. Further, network device 14 begins normal operation. For example, in the case where network device 14 is a router, network device 14 may begin the processing and routing of network traffic 31.

Typically all control plane and management traffic is encrypted. While secure zero touch provisioning (e.g., secure ZTP) and NETCONF over SSH are built on top of secure transport layers, not all protocols are such (e.g., syslog). Thus, a VPN may be configured between network device 14 and bootstrap server 18 as an aspect of the bootstrapping process. Different technologies may be used to implement these VPNs. For instance, they may be implemented in software or hardware. In one example, an MS-MPC line card may be used to perform hardware encryption of all control plane and management plane traffic. In some examples, the secure touchless provisioning operation described herein may be used to configure the MS-MPC line cards. In other examples, a user configures the MS-MPC line cards as an interactive step that occurs over a management connection (e.g., NETCONF over SSH), either through access via network device 14 or orchestrator server 20.

In some examples, the bootstrapping process may be further split into two operations: the first being an operation where network device 14 is configured with onboarding information and the second being an operation where orchestrator server 20 or another network management system configures network device 14 with additional software applications after orchestrator server 20 establishes a connection to network device 14 for the first time. In some examples, each touchless provisioning operation concludes with network device 14 sending a "bootstrap-complete" progress report to bootstrap server 18. Bootstrap server 18 may propagate this report to orchestrator server 20, thus providing a signal for when orchestrator server 20 may perform first-time operations on network device 14.

In some examples, orchestrator server 20 may obtain ownership vouchers 33 from voucher server 10 of service provider network 32. For example, voucher server 10 may provide a REST-based API that authenticates operator credentials. Voucher server 10 verifies that a device within customer network 30, such as network device 14, is owned by an operator of customer network 30. Voucher server 10 encodes an owner certificate of orchestrator server 20 into the ownership voucher; network device 14 may use the owner certificate to verify onboarding information signed by the owner during a touchless provisioning operation. Network device 14 may, for example, use a preconfigured trust anchor for verifying ownership vouchers were generated by a trusted authority. Network device 14 may also, for example, examine the ownership voucher to ensure that it contains the network device's serial number, and therefore knows that the ownership voucher applies to the network device 14. Voucher server 10 may issue a voucher signed by a signing authority trusted by a manufacturer of network device 14 (or the manufacturer itself) to each authorized device accessing customer network 30.

As one example, orchestrator 20 generates a PKI for owner certificates. Orchestrator 20 requests, from voucher server 10 to provide vouchers, containing a supplied domain certificate, for a list of devices (identified by their serial numbers) authorized to access customer network 30. Voucher server 10 provides a list of ownership vouchers for the devices authorized to access customer network 30. Orchestrator 20 stores the device-specific ownership vouchers and owner certificates for subsequent use. Orchestrator 20 may use the stored device-specific ownership vouchers and owner certificates to sign bootstrapping data for network device 14 during touchless provisioning operations to configure network device as described above.

Thus, by using the techniques of the disclosure, the network device may maintain configuration information obtained during the bootstrapping process within a volatile memory of the network device. Upon loss of power to the network device, the network device loses any information that may be of use to a malicious actor that has physical access to the network device, such as user data, configuration information, or boot images. Each boot cycle, network device 14 may retrieve a new onboarding information upon startup using a touchless provisioning operation. Further, after the first initialization, local access to network device 14, such as via console ports, is disabled.

Accordingly, the techniques of the disclosure provide specific improvements to the computer-related field of network device deployment and configuration. For example, the techniques of the disclosure may allow for the deployment to public spaces of network devices that are secured from physical or local attack by a malicious actor. Further, the techniques of the disclosure may allow for the use of touchless provisioning to securely and remotely configure a network device. Additionally, the techniques of the disclosure may reduce the cost and technical burden on the end user of deploying and configuring network devices to operate within an enterprise network. Further, the techniques of the disclosure may reduce the complexity of deployment, maintenance, and upgrading of network devices.

Figure 2:
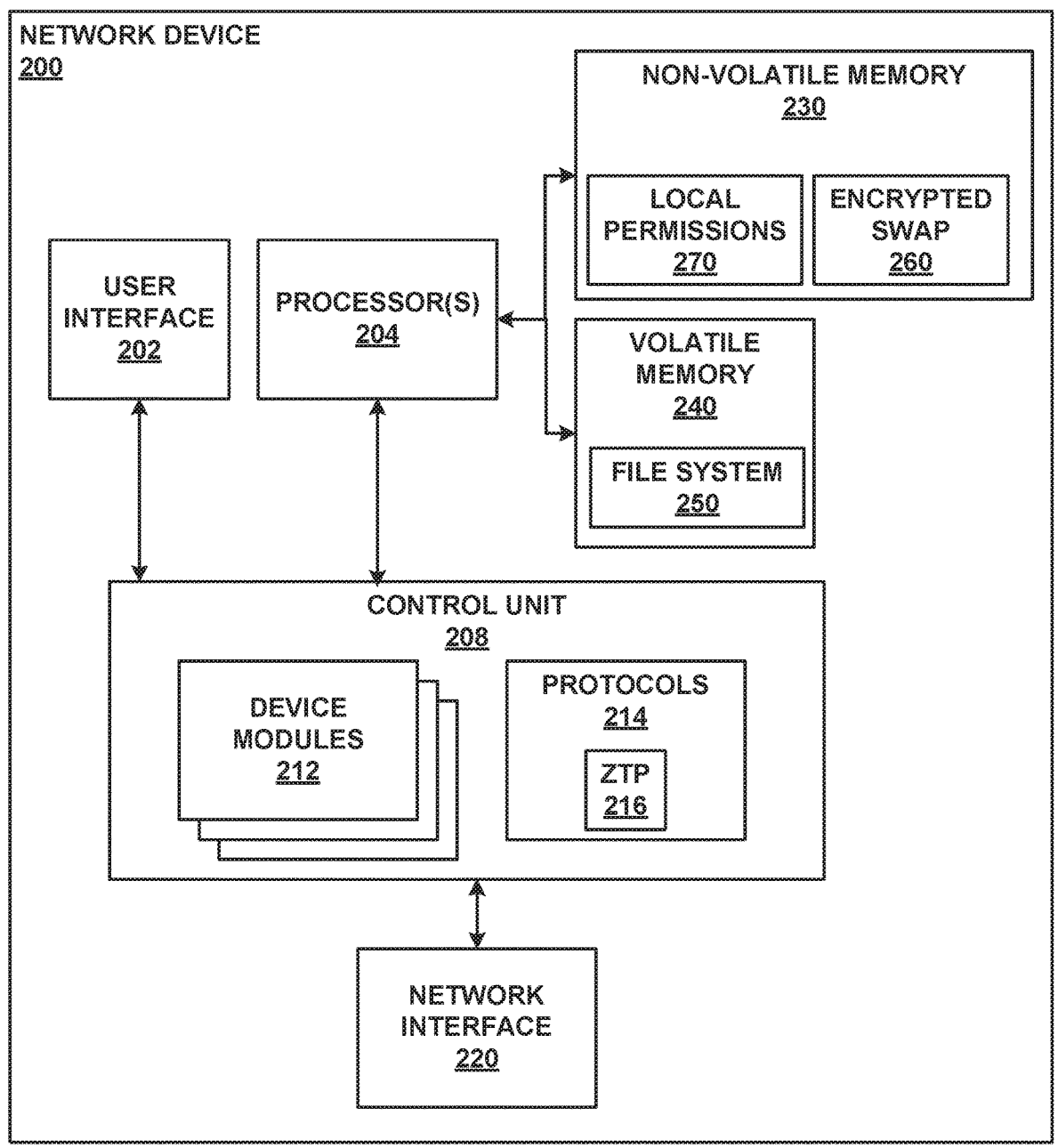
FIG. 2 is a block diagram illustrating an example network device in accordance with the techniques of the disclosure.

FIG. 2 is a block diagram illustrating an example network device 200 in accordance with the techniques of the disclosure. In some examples, network device 200 is an example of network device 14 of FIG. 1. For example, network device 200 may correspond to a router, a bridge, a hub, a switch, a server, a printer, a gateway, a firewall, an IDP device, or other network device. In the example of FIG. 2, network device 200 includes user interface module 202, control unit 208, and network interface 220.

User interface 202 is configured to send/receive data to/from a user, such as a network administrator. Typically, user interface 202 comprises a console port that enables local access by a user, such as an administrator. However, in some examples, user interface 202 is or otherwise includes a workstation, a keyboard, pointing device, voice responsive system, video camera, biometric detection/response system, button, sensor, mobile device, control pad, microphone, presence-sensitive screen, network, or any other type of device for detecting input from a human or machine. In some examples, user interface 202 further includes a display for displaying an output to the user. The display may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, user interface 202 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, user interface 202 may include a presence-sensitive display that may serve as a user interface device that operates both as one or more input devices and one or more output devices.

Control unit 208 comprises hardware for performing the techniques of this disclosure. Processors 204 may include any one or more of a microprocessor, a controller, a digital signal processor (DSP), an application specific integrated circuit (ASIC), a field-programmable gate array (FPGA), or equivalent discrete or integrated logic circuitry. Network device further includes non-volatile memory 230 and volatile memory 240. As described herein, "non-volatile memory" refers to a storage device which retains data even if power to the non-volatile memory is lost. In contrast, as described herein, "volatile memory" refers to a storage device which loses data if power to the volatile memory is lost. Alternatively, control unit 208 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described herein.

Non-volatile memory 230 may include a disk drive, an optical drive, memory, such as random-access memory (RAM), read only memory (ROM), programmable read only memory (PROM), erasable programmable read only memory (EPROM), electronically erasable programmable read only memory (EEPROM), flash memory, etc., comprising executable instructions for causing processors 204 to perform the actions attributed to them.

Volatile memory 100 may include memory, such as random-access memory (RAM) or flash memory, etc., comprising executable instructions for causing processors 204 to perform the actions attributed to them.

In the example of FIG. 2, control unit 208 comprises device modules 212 and protocols 214, which may comprise software modules executed by control unit 208 or discrete, independent hardware units of control unit 208. When any or all of device modules 212 and protocols 214 comprise software, instructions executable by a processor for device modules 212 and protocols 214 may be encoded in a computer-readable medium of network device 200, such as non-volatile memory 230 or volatile memory 240.

Network interface 220 may comprise any interface for connecting to devices of a computer network, such as DHCP server 16, bootstrap server 18, or orchestrator server 20 of FIG. 1. For example, network interface 220 may comprise an Ethernet interface, a gigabit Ethernet interface, a telephone modem, a cable modem, a satellite modem, or other network interface. In some examples, network interface 220 comprises one or more network interface cards.

Device modules 212 generally correspond to components specific to network device 200. For example, when network device 200 comprises a router, device modules 212 may comprise a control plane that maintains a routing information base, a forwarding engine that maintains a forwarding information base, one or more routing protocols, or other modules required to route packets through a network. As another example, when network device 200 comprises a security device, device modules 212 may comprise a protocol decoder module, an application identification module, and an attack detection module, or other network security modules. Protocols 214 comprise one or more communication protocols for communicating with management device 10 and/or other network devices. For example, protocols 214 may comprise a touchless provisioning protocol such as ZTP 216. Protocols 214 may also comprise one or more routing protocols, security protocols, or other protocols, depending upon the type of device to which network device 200 corresponds.

In accordance with the techniques of the disclosure, network device 200 performs a secure, remote bootstrapping operation. Upon startup, processors 204 perform a first touchless provisioning operation to request, from DHCP server 16, address information for bootstrap server 18. Upon receiving the address information for bootstrap server 18, processors 204 perform a second touchless provisioning operation to request, from bootstrap server 18, onboarding information for network device 200.

Processors 204 process the onboarding information to determine whether a first initialization of network device 200 has occurred. If the first initialization has not yet occurred, processors 204 perform the first initialization. For example, processors 204 may perform the first initialization by configuring local user access permissions 270 of network device 200 and configuring network device 200 to mount at least a portion of file system 250 to volatile memory 240 and not non-volatile memory 230. Further, processors 204 cause network device 200 to reboot.

To configure local user access permissions 270, processors 204 may perform a secure hardening of network device 200 by disabling one or more console ports and/or open management ports of network device 200 or by setting a root access password to network device 200. Typically, processors 204 store local user access permissions 270 in non-volatile memory 230 such that local user access permissions 270 are not lost upon power loss to network device 200

For each subsequent boot cycle, processors 204 perform an operating-system level initialization. For example, processors 204 mount at least a portion of file system 250 to volatile memory 240. As another example, processors 204 encrypt at least a portion of non-volatile memory 230, such as swap portion 260. Further, processors 204 perform a touchless provisioning-level initialization. As an example, processors 204 perform a touchless provisioning operation to retrieve onboarding information from bootstrap server 18. Processors 204 store the onboarding information in volatile memory 240 such that the onboarding information is not retained upon loss of power to or reboot of network device 200. Processors 204 process the onboarding information to determine whether the first initialization of network device 200 has occurred. In response to determining that the first initialization has occurred, processors 204 perform a bootstrapping operation. As examples of bootstrapping operations, processors 204 may configure network device 200 for remote management by another network device (e.g., orchestrator server 20). For example, processors 204 may assign a hostname, IP address, or port for communication with orchestrator server 20, processors 204 may define a trust anchor certificate to authenticate orchestrator server 20, and processors 204 may establish an admin account with which orchestrator server 20 may access network device 200. As further examples, processors 204 may disable the console on system ports, enable access of system services via SSH, disable the use of passwords to network device 200 via SSH, allow root login via SSH, configure a root account for SSH public-key authentication, and configure network device 200 to initiate an outbound SSH session (e.g., with orchestrator 20). Typically, processors 204 store any configuration that is performed at this stage (e.g., after the first initialization has occurred) in volatile memory 240 such that the configuration is not retained upon loss of power to or reboot of network device 200. After completing the bootstrapping operation, processors 204 may establish secure management connections (e.g., NETCONF) to orchestrator server 20 and commence operation of network device 200. For example, in the case where network device 200 is a router, processors 204 may begin the processing and routing of network traffic.

Thus, by using the techniques of the disclosure, network device 200 may maintain at least a portion of filesystem 250 within volatile memory 240. Upon loss of power to network device 200, volatile memory 240 loses the portion of filesystem 250. Further, network device 200 may lose a cryptographic cypher for accessing encrypted swap 260. Thus, network device 200 does not retain any information in filesystem 250 or swap 260 that may be of use to a malicious actor that has physical access to network device 200. Each boot cycle, network device 200 may perform a new touchless provisioning operation to perform bootstrapping of network device 200 and so remount the portion of filesystem 250 to volatile memory 240. Further, after the first initialization, local access to network device 200, such as via console ports of user interface 202, is disabled.

Figure 3:
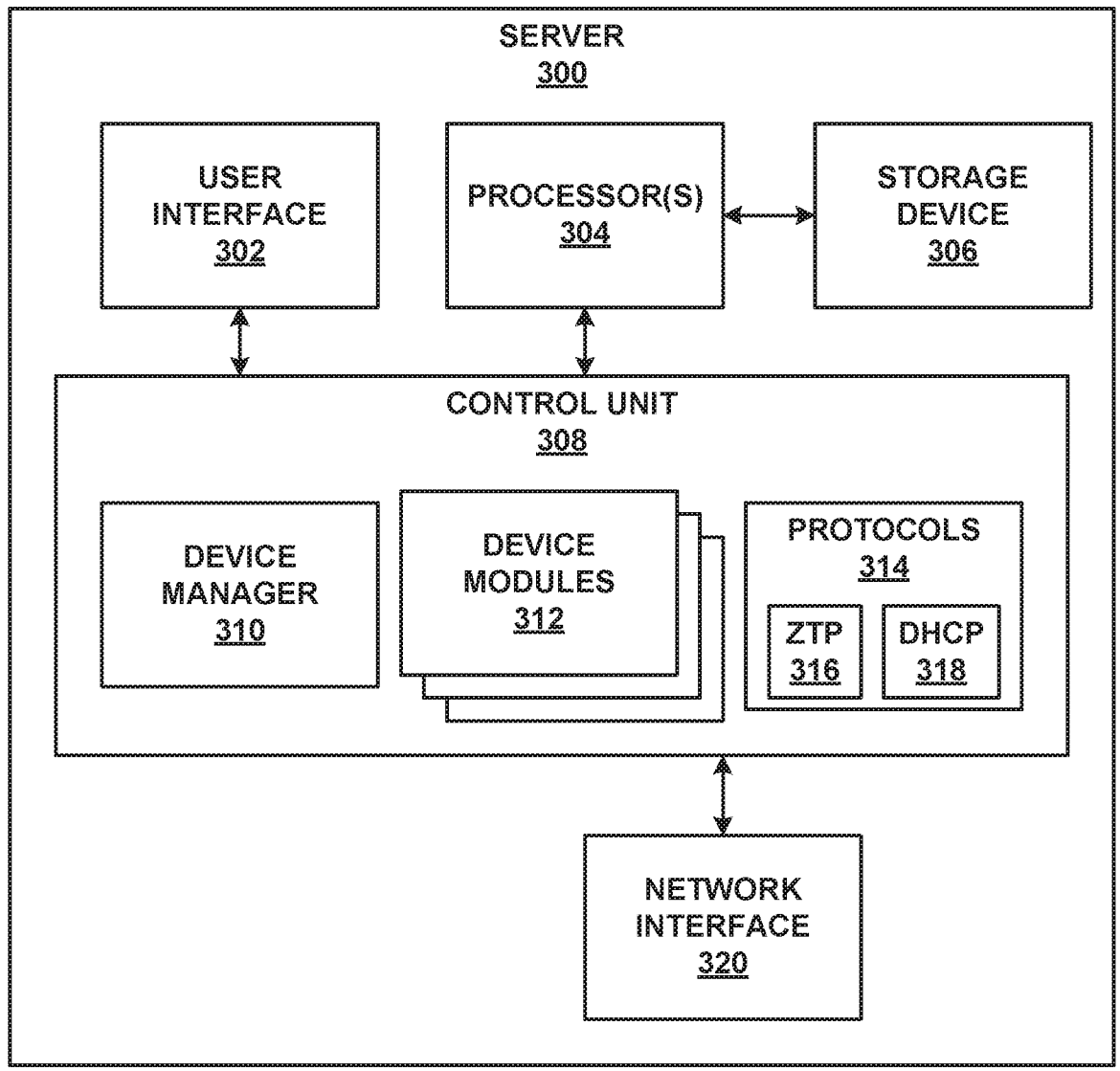
FIG. 3 is a block diagram illustrating an example server in accordance with the techniques of the disclosure.

FIG. 3 is a block diagram illustrating example server 300 in accordance with the techniques of the disclosure. Server 300 is a computing device that may implement, for example, one or more of DHCP server 16, bootstrap server 18, orchestrator server 20, or voucher server 10 of FIG. 1. In the example of FIG. 3, server 300 includes user interface 302, control unit 308, and network interface 320.

User interface 302 is configured to send/receive data to/from a user, such as a network administrator. In some examples, user interface 302 is or otherwise includes a workstation, a keyboard, pointing device, voice responsive system, video camera, biometric detection/response system, button, sensor, mobile device, control pad, microphone, presence-sensitive screen, network, or any other type of device for detecting input from a human or machine. In some examples, user interface 302 further includes a display for displaying an output to the user. The display may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, user interface 302 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, user interface 302 may include a presence-sensitive display that may serve as a user interface device that operates both as one or more input devices and one or more output devices.

Network interface 320 may comprise any interface for connecting to devices of a computer network, such as network device 14 of customer network 30. For example, network interface 320 may comprise an Ethernet interface, a gigabit Ethernet interface, a telephone modem, a cable modem, a satellite modem, or other network interface. In some examples, network interface 320 comprises one or more network interface cards.

Control unit 308 comprises hardware for performing the techniques of this disclosure. Processors 304 may include any one or more of a microprocessor, a controller, a digital signal processor (DSP), an application specific integrated circuit (ASIC), a field-programmable gate array (FPGA), or equivalent discrete or integrated logic circuitry. Storage device 306 may include a disk drive, an optical drive, memory, such as random-access memory (RAM), read only memory (ROM), programmable read only memory (PROM), erasable programmable read only memory (EPROM), electronically erasable programmable read only memory (EEPROM), flash memory, comprising executable instructions for causing the processors 304 to perform the actions attributed to them. Alternatively, control unit 308 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described herein.

In the example of FIG. 3, control unit 308 comprises device manager 310, device modules 312, and protocols 314, which may comprise software modules executed by control unit 308 or discrete, independent hardware units of control unit 308. When any or all of device manager 310, device modules 312, and protocols 314 comprise software, e.g., executable software modules, instructions executable by a processor for device manager 310, device modules 312, and protocols 314 may be encoded in a computer-readable medium, such as storage device 306.

Device manager 310 interacts with one or more managed devices, e.g., network device 14, to manage the network devices. In one example, device manager 310 executes an implementation of NETCONF. Device manager 310 sends electrical signals to managed network device 14 via network interface 320. Therefore, device manager 310 sends and receives packets comprising data for managing the managed network devices 14 indirectly via a network, such as the Internet, to, e.g., network devices 14.

Device modules 312 generally correspond to components specific to server 300. For example, device modules 312 may comprise a control plane that maintains a routing information base, a forwarding engine that maintains a forwarding information base, one or more routing protocols, or other modules required to route packets through a network.

In the example where server 300 is an example of DHCP server 16 of FIG. 1, device modules 312 include a DHCP module for providing DHCP services to devices within customer network 30, such as network device 14, bootstrap server 18, and customer devices 36. In some examples, server 300 may provide redirect information in response to a touchless provisioning operation by network device 14. For example, in response to a first touchless provision operation in which network device 14 requests a network assignment and requests redirect information for onboarding information, server 300 provides address information for reaching bootstrap server 18. Typically, server 300 provides this information using an unsecured protocol. In some examples, the address information is a list of one or more bootstrap servers 18 from which network device 14 may obtain configuration information. In some examples, the list is a tuple data structure that specifies a hostname and a port for bootstrap server 18. In some examples, the address information is redirect information which redirects a request for configuration information from network device 14 to bootstrap server 18.

In the example where server 300 is an example of bootstrap server 18 of FIG. 1, server 300 may be used as a source of onboarding information for network device 14. As described herein, network device 14 may request onboarding information from bootstrap server 18 via a touchless provisioning operation to perform automatic configuration of network device 14. In some examples, the touchless provisioning operation is a ZTP operation. For example, in response to a second touchless provisioning request from network device 14, server 300 provides onboarding information for network device 14. In some examples, the onboarding information specifies a particular boot image that network device 14 is to use, an initial configuration that network device 14 should use, and one or more scripts for execution by network device 14. In some examples, the onboarding information specifies a particular operating system type and version. In some examples, network device 14 uses the onboarding information to configure one or more remote management protocols, such as NETCONF over SSH, and to configure whether network device 14 initiates an outbound SSH connection, or opens a port enabling inbound SSH connections. In some examples, network device 14 uses the onboarding information to configure whether orchestrator server 20 or another user may access network device 14 via a root or other login. In some examples, network device 14 uses the onboarding information to configure how SSH authentication may be performed (e.g., via password, public-key encryption, RADIUS, tacplus, etc.).

In the example where server 300 is an example of orchestrator server 20 of FIG. 1, server 300 may obtain ownership vouchers from voucher server 10 of service provider network 32, provide DHCP configuration to DHCP server 16 to enable DHCP server 16 to provide DHCP services to devices within customer network 30, or provide bootstrap configuration information to bootstrap server 18 to enable bootstrap server 18 to provide bootstrap services to network device 14. Additionally, once network device 14 is deployed and activated, server 300 may establish secure management connections to manage network device 14 using a communications protocol, such as NETCONF. Further, orchestrator server 20 may forward network traffic to network device 14 for processing and routing.

In the example where server 300 is an example of voucher server 10 of FIG. 1, server 300 may provide a REST-based API that authenticates operator credentials. For example, server 300 verifies that a device within customer network 30, such as network device 14, is owned by an operator of customer network 30. Server 300 encodes an owner certificate of orchestrator server 20 into the ownership voucher; network device 14 may use the owner certificate to verify onboarding information signed by the owner during a touchless provisioning operation. Server 300 may issue a voucher signed by a signing authority trusted by a manufacturer of network device 14 (or the manufacturer itself) to each authorized device accessing customer network 30.

Protocols 314 comprise one or more network communication protocols for communicating over a network. For example, protocols 314 may comprise one or more routing protocols, security protocols, or other protocols, e.g., a touchless provisioning protocol such as ZTP 316, DHCP 318, or other network protocols for communicating over a network not expressly depicted in FIG. 3, such as SSH, PPP, PPPoE, PPPoA, MPLS, BGP, SNMP, NETCONF, etc.

Figure 4:
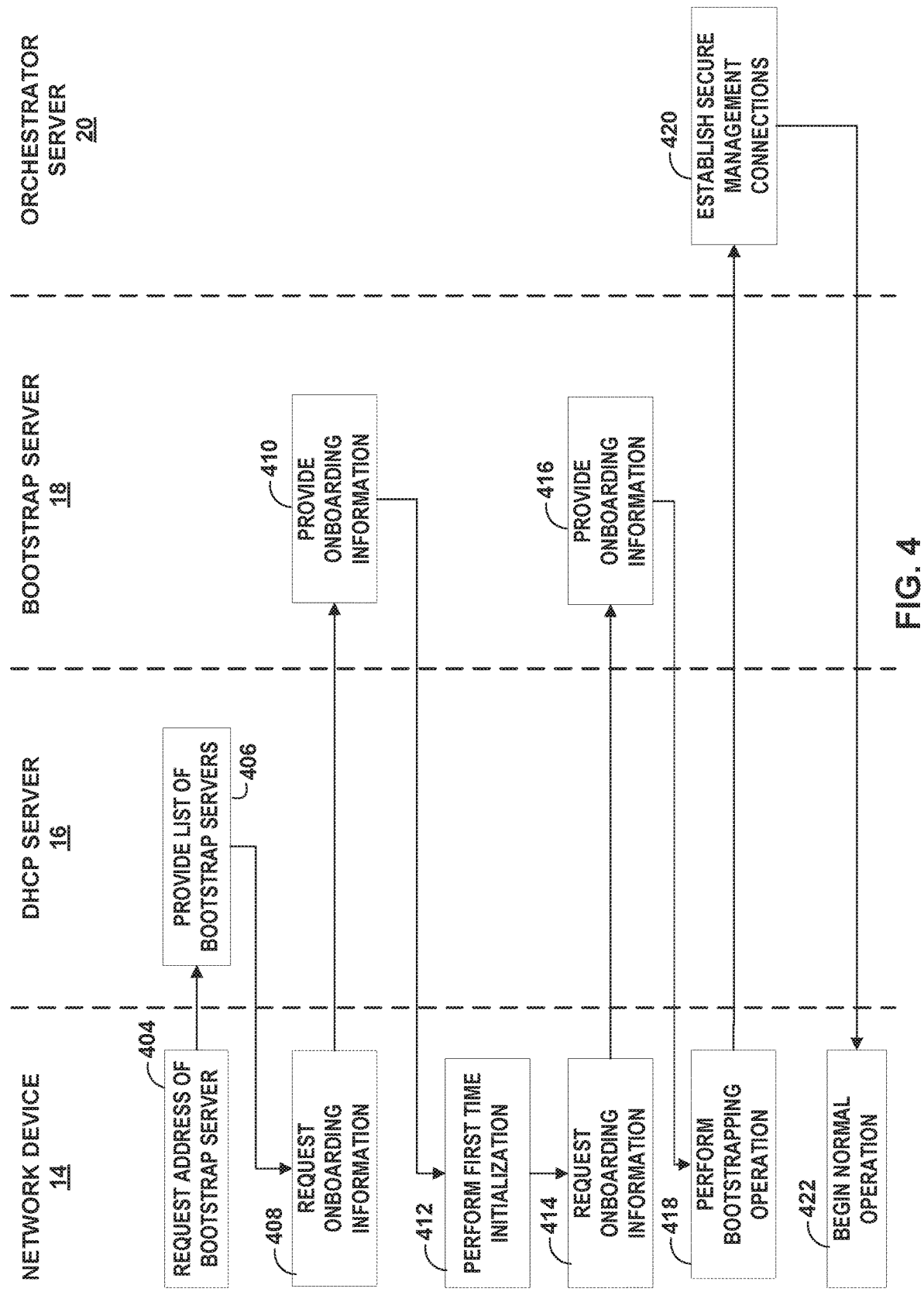
FIG. 4 is a flowchart illustrating an example secure remote bootstrapping operation in accordance with the techniques of the disclosure.

FIG. 4 is a flowchart illustrating an example secure remote bootstrapping operation in accordance with the techniques of the disclosure. For convenience, FIG. 4 is described with respect to FIG. 1.

In one example, upon startup, network device 14 performs a first touchless provisioning operation to request, from DHCP server 16, address information for bootstrap server 18 (404). In response, DHCP server 16 provides the address information as a list of one or more bootstrap servers 18 from which network device 14 may obtain configuration information (406). In some examples, the list is a tuple data structure that specifies a hostname and a port for bootstrap server 18. In some examples, the address information is redirect information which redirects a request for configuration information from network device 14 to bootstrap server 18.

Upon receiving the address information for bootstrap server 18, network device 14 performs second touchless provisioning operation 23 to request, from bootstrap server 18, onboarding information for network device 14 (408). Bootstrap server 18 provides the boot configuration information to network device 14 (410). Network device 14 receives the onboarding information from bootstrap server 18. Typically, the configuration information received from bootstrap server 18 is signed.

Network device 14 processes the onboarding information to determine whether a first initialization of the network device has occurred. In response to determining that the first initialization has not yet occurred, network device 14 performs the first initialization (412). For example, network device 14 may perform the first initialization by configuring local user access permissions and configuring itself to mount at least a portion of a file system to a volatile memory of network device 14 and not a non-volatile memory of network device 14. For example, network device 14 may perform a secure hardening of network device 14 by disabling one or more console ports and/or open management ports of network device 14 or by setting a root access password to network device 14. Typically, network device 14 stores the local user access permissions in a non-volatile memory of network device 14 such that the local user access permissions are not lost upon power loss to network device 14. Further, network device 14 reboots itself.

For each subsequent boot cycle, network device 14 mounts at least a portion of the file system to the volatile memory. In some examples, network device 14 encrypt at least a portion of the non-volatile memory, such as a swap portion of the file system. Further, network device 14 performs a third touchless provisioning operation to request the onboarding information (414). Network device 14 processes the onboarding information to determine whether the first initialization of network device 14 has occurred. In response to determining that the first initialization has occurred, network device 14 performs a bootstrapping operation (418). As examples of bootstrapping operations, network device 14 configure itself for remote management by another network device (e.g., orchestrator server 20). Further, network device 14 may perform volatile configuration of network device 14. As examples of volatile configuration, network device 14 may disable the console on system ports, enable access of system services via SSH, disable the use of passwords to network device 14 via SSH, allow root login via SSH, configure a root account for SSH public-key authentication, and configure network device 14 to initiate an outbound SSH session.

After completing the bootstrapping operation, orchestrator server 20 and network device 14 may establish secure management connections (e.g., NETCONF) with one another (420). Further, network device 14 begins normal operation (422). For example, in the case where network device 14 is a router, network device 14 commences the processing and routing of network traffic 31.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    performing, by one or more processors of a network device, a first request for onboarding information for the network device;
    processing, by the one or more processors, the onboarding information to determine that a first initialization of the network device has not occurred;
    in response to determining that the first initialization of the network device has not occurred, performing the first initialization by:
        configuring, by the one or more processors and with the onboarding information, the network device to mount at least a portion of a file system to a volatile memory of the network device and not a non-volatile memory of the network device; and
        rebooting, by the one or more processors, the network device; after rebooting the network device:
            performing, by the one or more processors, a second request for the onboarding information for the network device;
            processing, by the one or more processors, the onboarding information to determine that the first initialization of the network device has occurred; and
            in response to determining that the first initialization of the network device has occurred, performing, by the one or more processors, a bootstrapping operation of the network device.

2. The method of claim 1, further comprising mounting the at least a portion of the file system to the volatile memory of the network device after rebooting the network device.

3. The method of claim 2, further comprising:
    after mounting the at least a portion of the file system to the volatile memory of the network device, losing the at least a portion of the file system from the volatile memory of the network device upon loss of power to the network device.

4. The method of claim 1, wherein performing the bootstrapping operation of the network device comprises configuring the network device for remote management by a second network device.

5. The method of claim 4, wherein configuring the network device for remote management by the second network device comprises processing the onboarding information to obtain one or more of a hostname, a network address, a port, a network protocol, or a security certificate of the second network device.

6. The method of claim 4, wherein configuring the network device for remote management by the second network device comprises initializing, by the network device and based on the onboarding information, a remote communication session with the second network device.

7. The method of claim 1, wherein performing the bootstrapping operation of the network device comprises encrypting a swap space of the non-volatile memory of the network device with a one-time key.

8. The method of claim 1,
    wherein the network device is a first network device,
    wherein performing the first request for the onboarding information for the network device comprises requesting, from one or more network devices via a first touchless provisioning operation, the onboarding information for the first network device, and
    wherein performing the second request for the onboarding information for the network device comprises requesting, from the one or more network devices via a second touchless provisioning operation, the onboarding information for the first network device.

9. The method of claim 8, wherein the first and second touchless provisioning operations are first and second Zero-Touch Provisioning (ZTP) operations.

10. The method of claim 8, further comprising:
    prior to requesting, via the first touchless provisioning operation, the onboarding information for the first network device, requesting, by the one or more processors, from a Dynamic Host Configuration Protocol (DHCP) server, and via a third touchless provisioning operation, address information for the one or more network devices.

11. The method of claim 1, wherein performing the first initialization further comprises configuring, by the one or more processors, local user access permissions to the network device.

12. The method of claim 11, wherein configuring the local user access permissions to the network device comprises at least one of:
    disabling, by the one or more processors, one or more console ports of the network device; or
    setting, by the one or more processors, a password for root access to the network device.

13. The method of claim 11, wherein configuring the local user access permissions to the network device comprises further comprises storing the local user access permissions to the network device in the non-volatile memory of the network device and not the volatile memory of the network device.

14. A network device comprising:
    a non-volatile memory;
    a volatile memory; and
    one or more processors configured to:
        perform a first request for onboarding information for the network device;
        process the onboarding information to determine that a first initialization of the network device has not occurred;
        in response to determining that the first initialization of the network device has not occurred, perform the first initialization by:
            configuring, with the onboarding information, the network device to mount at least a portion of a file system to the volatile memory and not the non-volatile memory; and
            rebooting the network device;
        after rebooting the network device:

perform a second request for the onboarding information for the network device;

process the onboarding information to determine that the first initialization of the network device has occurred; and in response to determining that the first initialization of the network device has occurred, perform a bootstrapping operation of the network device.

15. The network device of claim 14, wherein the one or more processors are further configured to mount the at least a portion of the file system to the volatile memory of the network device after rebooting the network device.

16. The network device of claim 15, wherein after mounting the at least a portion of the file system to the volatile memory of the network device, the network device is further configured to lose the at least a portion of the file system from the volatile memory upon loss of power to the network device.

17. The network device of claim 14, wherein, to perform the bootstrapping operation of the network device, the one or more processors are further configured to configure the network device for remote management by a second network device.

18. The network device of claim 14, wherein, to perform the bootstrapping operation of the network device, the one or more processors are further configured to encrypt a swap space of the non-volatile memory of the network device with a one-time key.

19. The network device of claim 14, wherein the network device is a first network device, wherein, to perform the first request for the onboarding information for the network device, the one or more processors are configured to request, from one or more network devices via a first touchless provisioning operation, the onboarding information for the first network device, and wherein, to perform the second request for the onboarding information for the network device, the one or more processors are configured to request, from the one or more network devices via a second touchless provisioning operation, the onboarding information for the first network device.

20. A non-transitory computer-readable medium comprising instructions configured to cause one or more processors of a network device to:

perform a first request for onboarding information for the network device;

process the onboarding information to determine that a first initialization of the network device has not occurred;

in response to determining that the first initialization of the network device has not occurred, perform the first initialization by:

configuring, with the onboarding information, the network device to mount at least a portion of a file system to a volatile memory of the network device and not a non-volatile memory of the network device; and rebooting the network device;

after rebooting the network device:

perform a second request for the onboarding information for the network device;

process the onboarding information to determine that the first initialization of the network device has occurred; and in response to determining that the first initialization of the network device has occurred, perform a bootstrapping operation of the network device.

\* \* \* \* \*